United States Patent [19]

Kuwayama et al.

[11] Patent Number: 5,035,473
[45] Date of Patent: Jul. 30, 1991

[54] DISPLAY APPARATUS

[75] Inventors: Tetsuro Kuwayama, Yokohama; Naosato Taniguchi, Atsugi; Yoko Yoshinaga, Machida; Nobuo Kushibiki, Yamato, all of Japan

[73] Assignee: Canon Kabushiki Kaisha, Tokyo, Japan

[21] Appl. No.: 355,347

[22] Filed: May 23, 1989

[30] Foreign Application Priority Data

May 25, 1988 [JP] Japan .................. 63-125957

[51] Int. Cl.⁵ .............................. G02B 5/32
[52] U.S. Cl. ................... 350/3.7; 350/162.2; 350/162.23; 350/174
[58] Field of Search ........... 350/3.61, 3.7, 3.72, 350/162.17, 162.18, 162.2, 162.23, 171, 174

[56] References Cited

U.S. PATENT DOCUMENTS

| | | | |
|---|---|---|---|
| 3,580,655 | 5/1971 | Leith et al. | |
| 4,201,441 | 5/1980 | Matsumoto et al. | |
| 4,330,211 | 5/1982 | Peterson et al. | 350/162.17 |
| 4,490,021 | 12/1984 | Moya | 350/162.23 |
| 4,613,200 | 9/1986 | Hartman | 350/174 |
| 4,688,879 | 8/1987 | Fairchild | |
| 4,763,990 | 8/1988 | Wood | 350/174 |
| 4,832,427 | 5/1989 | Nanba et al. | 350/174 |

FOREIGN PATENT DOCUMENTS

| | | |
|---|---|---|
| 0268357 | 5/1988 | European Pat. Off. |
| 0278395 | 8/1988 | European Pat. Off. |
| WO8701211 | 2/1987 | PCT Int'l Appl. |
| 2197728 | 5/1988 | United Kingdom |

OTHER PUBLICATIONS

"Backside Diffraction by Relief Gratings," E. Popov, L. Mashev, Optics Communications, vol. 65, No. 2, Jan. 15, 1988 (pp. 97–100).
"Low Dispersion Holographic Mirrors with Very High Diffraction Efficiency", J. Jannson et al., Optical Soc. of America, Abstr. WK8, 1989 Ann. Mtg. p1257.
Japanese Abstract, vol. 11, No. 142 (May 9, 1987), French Search Report with Annex.

Primary Examiner—Bruce Y. Arnold
Assistant Examiner—J. P. Ryan
Attorney, Agent, or Firm—Fitzpatrick, Cella, Harper & Scinto

[57] ABSTRACT

A display apparatus comprises, a display unit, a first diffraction grating for diffracting the light from the display unit, and a second diffraction grating for diffracting the diffracted light from the first diffraction grating, the apparatus being constructed in such a manner that the optical path length between the display unit and the first diffraction grating is shorter than that between the first and second diffraction gratings.

17 Claims, 3 Drawing Sheets

5,035,473

DISPLAY APPARATUS

BACKGROUND OF THE INVENTION

1. Field of the Invention

The present invention relates to a display apparatus for displaying information by means of a diffraction grating such as a hologram.

2. Related Background Art

U.S. Pat. No. 4,613,200 discloses a display apparatus utilizing the combination of a set of holograms and a display unit, in which the light from the display unit is reflected and diffracted by a hologram toward the other, and is again reflected and diffracted by the other hologram toward the observer so as to enter into the pupil of the observer. Since the optical path length between the display unit and a hologram closer thereto is larger than that between two holograms, said apparatus is associated with drawbacks that the dimension of the entire apparatus is inevitably large and that the viewing zone in which the observer can observe the displayed information is limited.

SUMMARY OF THE INVENTION

In consideration of the foregoing, the object of the present invention is to provide a display apparatus which is compact in size and is capable of enlarging the viewing zone of the observer.

The foregoing object can be achieved, according to the present invention, by an apparatus comprising a display unit, a first diffraction grating for diffracting the light from said display unit, and a second diffraction grating for diffracting the light from said first diffraction grating, wherein said apparatus is constructed in such a manner that the optical path length between said display unit and said first diffraction grating is shorter than that between said first and second diffraction gratings.

In case of using a relatively small display unit, the first and second diffraction gratings preferably constitute an enlarging optical system in order to facilitate the observation of the displayed information by the observer. Besides, according to the present invention, the first diffraction grating is preferably positioned in such a manner that the incident angle $\theta_1$ of the light entering the first diffraction grating is larger than the emergent angle $\theta_2$ of the light emerging from said first diffraction grating toward the second diffraction grating. In particular, the oberver can very satisfactorily observe the enlarged displayed information if a condition $\cos\theta_2/\cos\theta_1 \geq 1.2$ is satisfied.

The features and embodiment of the present invention will become fully apparent from the following description of the example.

DESCRIPTION OF THE PREFERRED EMBODIMENTS

Figure 1:
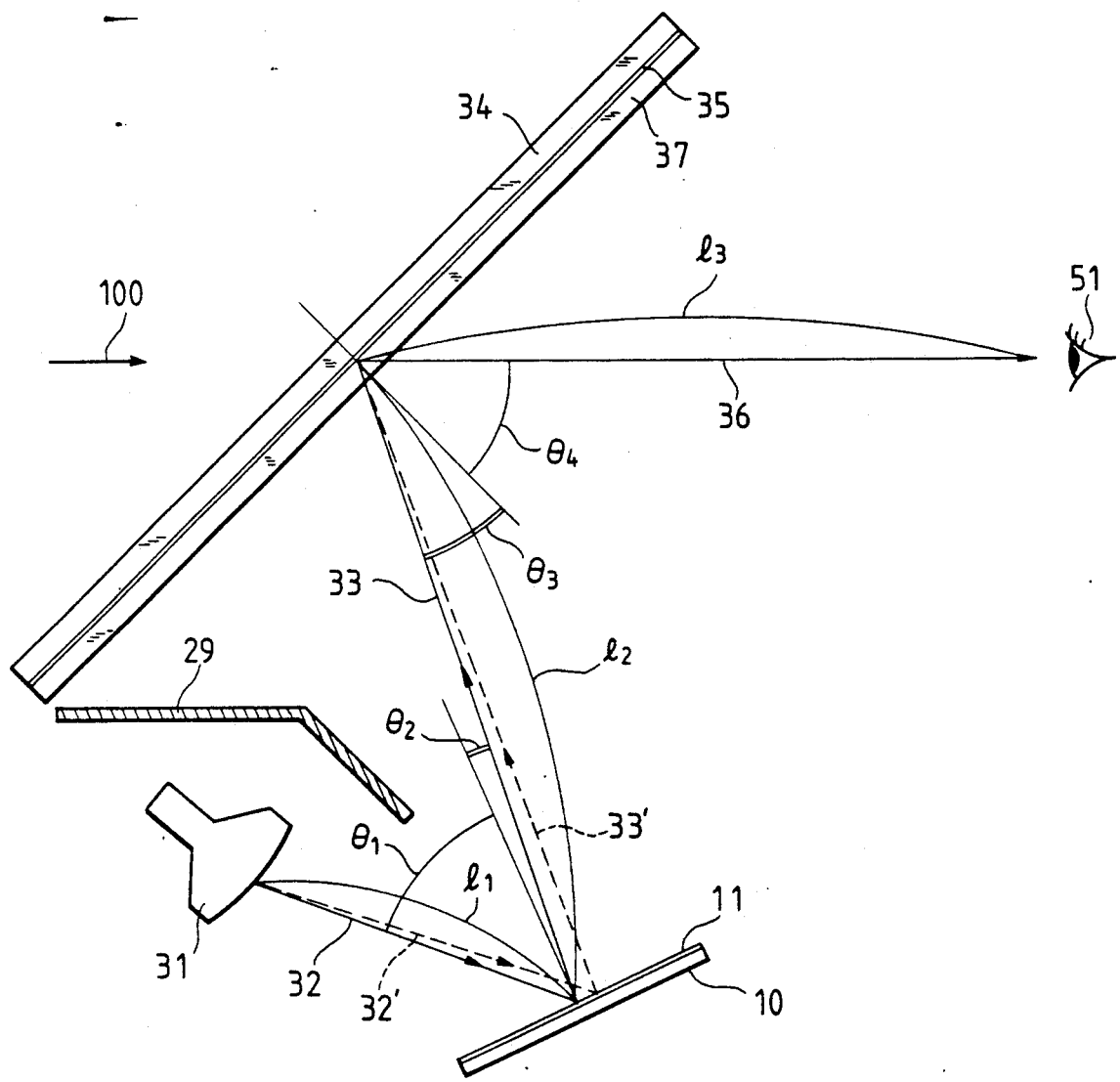
FIG. 1 is a schematic view of a first embodiment of the present invention.

FIG. 1 is a schematic view of a first embodiment of the present invention, applied to a head-up display of an automobile. FIG. 1 illustrates the driving seat of an automobile, in which the path of light emitted from a display unit 31 is shown. A light beam 32, bearing displayed information, emitted from a display surface of a display unit 31 such as a cathode ray tube or a fluorescent display tube is reflection-diffracted by a reflective diffraction grating 11 provided on a substrate 10, and a resulting light beam 33 enters a reflective volume phase-type diffraction grating (volume type hologram) 35 positioned between transparent substrates 34 and 37. A light beam 36 reflection-diffracted by said diffraction grating 35 enters the pupil 51 of the driver whereby the display is observed. A shield plate 29 prevents the display unit 31 from being directly seen from the outside, and protects the display unit 31 from external illumination.

In the present embodiment the display unit 31 and the diffraction grating 11 are so positioned that the optical path length from the display unit 31 to the diffraction grating 11 is shorter than that from the diffraction grating 11 to the diffraction grating 35, and the diffraction gratings 11, 35 constitute an enlarging optical system as will be explained later. The display unit 31 displays various information necessary for driving on the display surface, thereby assisting the driving operation of the driver.

The diffraction grating 35 is provided, as explained above, for transmitting the light beam from the display unit 31 to the pupil of the driver. The diffraction grating 35 of the present embodiment has a refractive power, whereby the driver observes an enlarged virtual image of the display surface of the display unit 31, formed by the diffraction grating 35. Said enlarged virtual image is usually formed in front of the automobile.

The transparent substrates 34, 37 and the diffraction grating 35 are translucent to the light 100 from an object in front of the automobile, so that the driver can observe the objects or scene in front of the automobile through these members. The transparent substrate 34 or 37 is adhered to the front glass of the automobile. It is also possible to incorporate the diffraction grating 35 in the front glass in such a manner that the transparent substrates 34, 37 constitute a part of said front glass of the automobile.

The display unit 31 is composed of a high-luminance cathode ray tube, utilizing a fluorescent material having an emission peak wavelength in the vicinity of 543 nm such as P43 or P53. The optical path length $l_1$ between the display unit 31 and the diffraction grating 11 is 80 mm; the optical path length $l_2$ between the diffraction gratings 11, 35 is 156 mm; the incident angle $\theta_1$ of the light to the diffraction grating 11 is 45°; and the emergent angle $\theta_2$ from the diffraction grating 11 is 5°.

The diffraction grating 11 is a reflective relief-type grating obtained by forming periodic grooves on the entrance side of a substrate by mechanical working. Also there may be employed a relief-type diffraction grating formed on the rear side of a transparent substrate, or a reflective volume-type diffraction grating such as a hologram. The relief surface of the grating 11 is provided with a reflective film for example of aluminum, for efficiently reflecting the light from the display unit 31. The form of the diffraction grating 11 can be a linear grating with a constant pitch, a light converging from such as a part of a zone plate, or a form functioning as a cylindrical lens. Said diffraction grating may be obtained, in addition to the mechanical working mentioned above, by a lithographic method in which a grating pattern on a mask is printed, or by a holographic pattern formation by the interference of two laser beams. Also the diffraction grating need not necessarily be a planar form but may assume a convex, concave or cylindrical form.

Since the investigation of the present inventors has clarified that a sufficient function as a display can be obtained with a linear grating with a constant pitch, the present embodiment employs, as the first diffraction grating 11, a relief-type diffraction grating obtained by engraving linear grating of a constant pitch on the surface of a substrate. Use of such relief-type diffraction grating contributes to the cost reduction of the display apparatus as it is easily mass producible.

In the present embodiment, the first diffraction grating 11 has a grating pitch $P_1$ of 0.88 μm. The light beam 33 enters the second diffraction grating 35 with an incident angle $\theta_3 = 25°$, and is reflection diffracted with an emerging angle $\theta_4 = 45°$. The diffraction grating 35 has a grating pitch $P_2$ of 1.91 μm. Said diffraction grating can be composed of various materials such as poly(N-vinylcarbazol), bichromic acid gelatin or gum Arabic. In the present embodiment there is employed poly(N-vinylcarbazol).

In the present embodiment there is employed a structure capable of preventing image blur, caused by color dispersion of the diffraction grating 35, of the displayed information observed by the driver.

In the following there will be given a brief explanation on this technology.

The light from the display unit 31 has a finite wavelength width, for example of a half-value width of 10 to 300 nm, and the reflective volume phase-type diffraction grating 35 also has wavelength dispersing characteristics with a half-value width of 10 to 100 nm.

The most marked deterioration in the image quality, in observing a display obtained by the combination of such light source and such diffraction grating, is the image blur in the vertical direction of the image.

Such image blur can be corrected in the following manner. Let us consider a light of a wavelength slightly longer than the central wavelength (for example 545 or 553 nm with respect to 543 nm). By tracing the light of said wavelength backwards along and path 36, starting from the pupil 51, there can be determined rays 33', 32'. Thus, if the diffraction grating 11 is constructed in such a manner that the ray 32' crosses a ray 32, corresponding to the central wavelength, on the display unit 31, the image blur in the vertical direction of the displayed information is corrected when viewed at the position of the pupil 51.

The above-mentioned structure can be attained by satisfying the following condition:

$$\left(\frac{l_2}{l_1}\right) = \left(\frac{P_2}{P_1}\right)\frac{\cos\theta_3 \cos\theta_2}{\cos^2\theta_1} - \frac{\cos^2\theta_2}{\cos^2\theta_1}$$

wherein:

$P_1 = \lambda_0 / |\sin\theta_1 - \sin\theta_2|$ $P_2 = \lambda_0 / |\sin\theta_4 - \sin\theta_3|$ In the present embodiment, the apparatus is so constructed as to satisfy this condition, thereby improving the quality of the displayed image.

Though other aberrations are also generated, it is experimentally confirmed that the correction of the above-mentioned color aberration is most effective.

In the first embodiment, the distances $l_1 = 80$ mm and $l_2 = 156$ mm, satisfying a condition $(l_2/l_1) = 1.95 > 1$, provide a compact apparatus with a widened viewing zone for the driver. Also the image magnification in the vertical direction is $m = (\cos\theta_2/\cos\theta_1) = 1.41$, principally due to the function of the diffraction grating 11, thus significantly improving the visibility of the displayed image.

A second embodiment was obtained, in the same structure as in the first embodiment, by employing a red-color display tube with a central wavelength of 620 nm as the display unit 31. The diffraction grating 11 had a pitch of 1.0 μm, while the diffraction grating 35 had a pitch $P_2 = 2.18$ μm satisfying the Bragg's condition for the central wavelength mentioned above. Thus there was obtained a display without image blur and with a wide viewing zone, in which the image is magnified by 1.41 times in the vertical direction by the function of the diffraction grating 11 as in the first embodiment.

Figure 2:
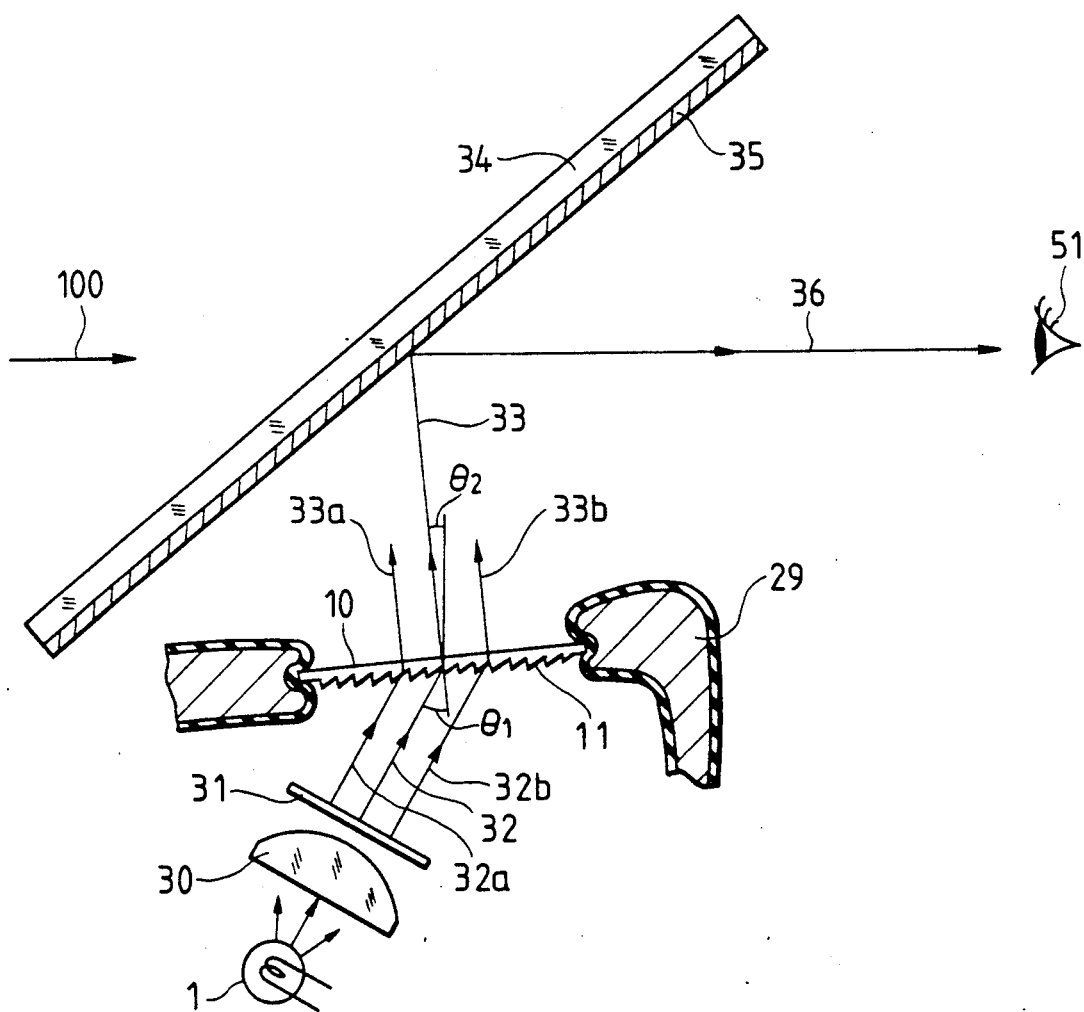
FIG. 2 is a schematic view of a third embodiment of the present invention.

Now reference to FIG. 2 for explaining a third embodiment of the present invention. A liquid crystal display unit 31 is illuminated from the back by means of a light source 1 and an illuminating lens 30. A central ray 32 of the image formed on the display surface of the display unit 31 enters a transmissive relief diffraction grating 11 formed on the lower face of a transparent substrate 10 and is diffracted therein to form a ray 33.

Said relief-type diffraction grating 11 is formed on the entrance side of the transparent substrate 10, which is formed integrally with a shield member 29.

The diffracted light 33 is reflected toward the pupil 51 of the driver so as to be a light 36 by a volume phase-type diffraction grating (volume type hologram) 35 which is formed on the entrance side of a transparent substrate 34 and which is transparent to a ray of light 100. Also in the present embodiment, the observer can observe the object in front by the light 100. Also the image of the display unit 31 is enlarged in the vertical direction principally by the function of the diffraction grating 11, as will be explained in the following.

Since the pupil 51 is sufficiently far from the display unit 31, a ray 32a coming from the upper part of the display surface of the display unit 31 and a ray 32b coming from the lower part of said display surface can be considered substantially parallel to the ray 32. Since the rays 33a, 33b after diffraction are also substantially parallel to the ray 33, there is obtained an image enlargement of $m = (\cos\theta_2/\cos\theta_1)$ times, wherein $\theta_1$ and $\theta_2$ are angles of said rays with respect to the diffraction grating 11.

The parameters of the present embodiment are as follows:

$\lambda_0$: 555 nm (at the center of visible wavelength range and appearing lightest to the eye)

$\theta_4$: 50°, $\theta_3$: 35°, $\theta_2$: 0°, $\theta_1$: 34°

$P_2$: 2.88 μm, $P_1$: 0.99 μm, $l_2$: 200 mm, $l_1$: 100 mm image magnification $m = 1.21$.

Experimentally it was confirmed that the image magnification of 1.21 times provided an enlarged image, with an widened viewing zone for the observer and with improved visibility when it was observed by the pupil 51. The use of a transmissive diffraction grating as in the present embodiment allows compactization of the entire apparatus. Also in the present embodiment, the substrate 10 bearing the diffraction grating 11 can serve as a cover for the display unit 31.

Figure 3:
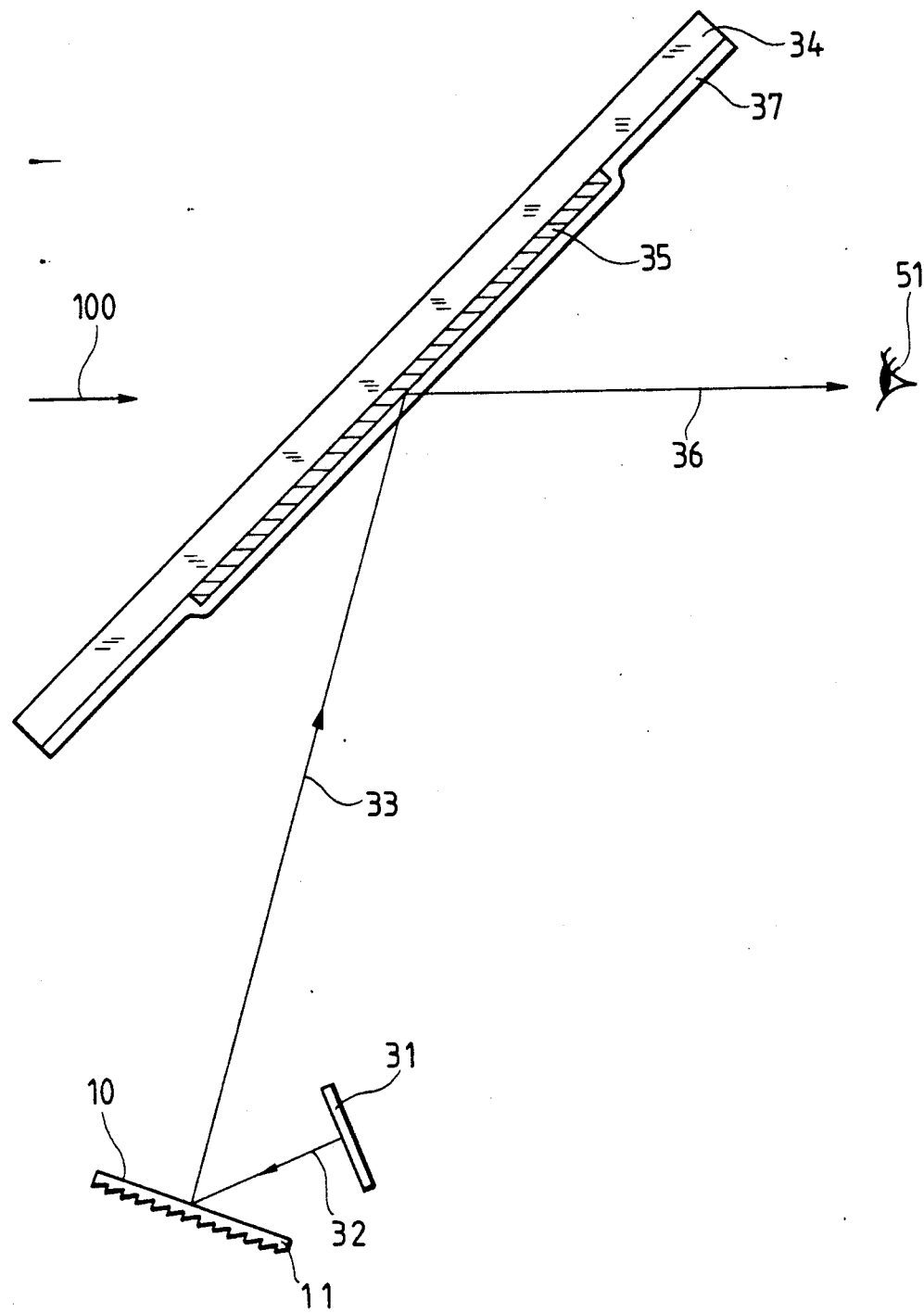
FIG. 3 is a schematic view of a fourth embodiment of the present invention.

FIG. 3 is a schematic view of a fourth embodiment of the present invention, in which a ray 32 from a fluorescent display tube 31, mainly emitting green light, is reflection-diffracted by a relief-type diffraction grating 11 formed on the surface with the opposite side of the light entering side (rear surface) of a substrate 10 to form a ray 33, which then enters a volume phase-type diffraction grating (volume-type hologram) 35 formed on a transparent substrate 34. Said grating 35 is covered by a transparent protective film 37. A ray 36 obtained by reflection-diffraction of the grating 35 enters the pupil 51 of the observer.

The parameters of the present embodiment are as follows:

$\lambda_0$: 510 nm
$\theta_4$: 45°, $\theta_3$: 60°, $\theta_2$: $-5°$, $\theta_1$: 55°
$P_2$: 3.21 μm, $P_1$: 0.563 μm
$l_2$: 295 mm, $l_1$: 60 mm
m = 1.74 times.

Also the apparatus of the present embodiment provides same effects as in the foregoing embodiments.

Since the relief diffraction grating 11 is formed on the rear side of an acrylic plate (refractive index 1.49) and the inclined planes of the grating 11 has an inclination angle of 18.4° with respect to the surface of the substrate, the incident light to said grating 10 and the reflection-diffracted light therefrom form a small angle of about 15° to said inclined planes. Thus there is achieved a high efficiency of reflection-diffraction, due to the reduced eclipse by the corner portions of the grating.

As explained in the foregoing embodiments, a diffraction grating 11, which is effective for correcting the image blur caused by vertical wavelength dispersion in the volume phase-type diffraction grating 35, is utilized also for image enlargement in the vertical direction of the displayed image. Said diffraction grating 11 is positioned close to the display unit 31, thereby enabling compactization of the grating 11 and the entire apparatus. In addition the viewing zone of the observer is widened, so that display with improved visibility can be viewed regardless of the position of the pupil of the observer.

Though the display apparatus shown in FIG. 1 is designed as a head-up display for an automobile, the display apparatus of the present invention is also suitable for other vehicles or as a stand-alone display apparatus. As many apparently widely different embodiments of the present invention may be made without departing from the spirit and scope thereof, it is to be understood that the present invention is usable for various applications.

We claim:

1. A display apparatus, comprising:
   a display unit for emitting light;
   a first diffraction grating for causing light from said display unit to be diffracted; and
   a second diffraction grating for causing the light diffracted by said first diffraction grating to be diffracted and directing it toward a pupil of an observer,
   wherein said apparatus satisfies the following condition;

$$\frac{l_2}{l_1} = \left(\frac{P_2}{P_1}\right)\frac{\cos\theta_3 \cdot \cos\theta_2}{\cos^2\theta_1} - \frac{\cos^2\theta_2}{\cos^2\theta_1}$$

where $l_1$ is a distance between said display unit and said first diffraction grating, $l_2$ is a distance between said first diffraction grating and said second diffraction grating, $P_1$ is a grating pitch of said first diffraction grating, $P_2$ is a grating pitch of said second diffraction grating, $\theta_1$ is an incident angle of the light on said first diffraction grating, $\theta_2$ is an exit angle of the light from said first diffraction grating, and $\theta_3$ is an incident angle of the light on said second diffraction grating.

2. An apparatus according to claim 1, further satisfying a condition $\theta_1 > \theta_2$.

3. An apparatus according to claim 2, further satisfying a condition of $(\cos\theta_2/\cos\theta_1) \geq 1.2$.

4. An apparatus according to claim 2, further satisfying a condition of $l_2 > l_1$.

5. An apparatus according to claim 4, wherein said second diffraction grating is composed of a hologram.

6. An apparatus according to claim 5, wherein said hologram is composed of a material principally consisting of poly (N-vinylcarbazol), dichromic acid gelatin or gum Arabic.

7. An apparatus according to claim 6, wherein said first diffraction grating is composed of a relief-type diffraction grating.

8. An apparatus according to claim 7, wherein said relief-type diffraction grating is formed on a rear surface of a transparent substrate.

9. An apparatus according to claim 8, further satisfying the following condition;

$P_1 = \lambda_0/|\sin\Theta_1 - \sin\Theta_2|$ $P_2 = \lambda_0/|\sin\Theta_4 - \sin\Theta_3|$ where $\lambda_0$ is the central wavelength of the light and $\theta_4$ is an exit angle of the light from said second diffraction grating.

10. A headup display apparatus, comprising:
   a display unit for emitting light;
   a first diffraction grating for causing light from said display unit to be diffracted; and
   a beam combiner having a second diffraction grating for causing the light diffracted by said first diffraction grating to be reflectively diffracted and directing it toward a pupil of an observer;
   wherein said apparatus satisfies the following condition, $$\frac{l_2}{l_1} = \left(\frac{P_2}{P_1}\right)\frac{\cos\theta_3 \cdot \cos\theta_2}{\cos^2\theta_1} - \frac{\cos^2\theta_2}{\cos^2\theta_1},$$

$P_1 = \lambda_0/|\sin\Theta_1 - \sin\Theta_2|$ $P_2 = \lambda_0/|\sin\Theta_4 - \sin\Theta_3|$ where $\lambda_1$ is a distance between said display unit and said first diffraction grating, $\lambda_2$ is a distance between said first diffraction grating and said second diffraction grating, $P_1$ is a grating pitch of said first diffraction grating, $P_2$ is a grating pitch of said second diffraction grating, $\theta_1$ is an incident angle of the light on said first diffraction grating, $\theta_2$ is an exit angle of the light from said first diffraction grating, $\theta_3$ is an incident angle of the light on said second diffraction grating, $\theta_4$ is an exit angle of the light from said second diffraction grating and $\lambda_0$ is the central wave length of the light.

11. An apparatus according to claim 10, further satisfying a condition of $\theta_1 > \theta_2$.

12. An apparatus according to claim 11, further satisfying a condition of $(\cos\theta_2/\cos\theta_1) \geq 1.2$.

13. An apparatus according to claim 11, further satisfying a condition of $l_2 > l_1$.

14. An apparatus according to claim 13, wherein said second diffraction grating is composed of a hologram.

15. An apparatus according to claim 14, wherein said hologram is composed of a material principally consisting of poly (N-vinylcarbazol), dichromic acid gelatin or gum Arabic.

16. An apparatus according to claim 15, wherein said first diffraction grating is composed of a relief-type diffraction grating.

17. An apparatus according to claim 16, wherein said relief-type diffraction grating is formed on a rear surface of a transparent substrate.

* * * * *